(12) United States Patent
Kim

(10) Patent No.: US 9,349,071 B2
(45) Date of Patent: May 24, 2016

(54) DEVICE FOR DETECTING PUPIL TAKING ACCOUNT OF ILLUMINANCE AND METHOD THEREOF

(71) Applicant: Hyundai Motor Company, Seoul (KR)

(72) Inventor: Seon A Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/668,839

(22) Filed: Mar. 25, 2015

(65) Prior Publication Data

US 2016/0110626 A1    Apr. 21, 2016

(30) Foreign Application Priority Data

Oct. 20, 2014 (KR) .................. 10-2014-0142099

(51) Int. Cl.
  *G06K 9/62* (2006.01)
  *G06K 9/46* (2006.01)
  *G06K 9/00* (2006.01)
  *G06K 9/03* (2006.01)

(52) U.S. Cl.
  CPC ............ *G06K 9/4661* (2013.01); *G06K 9/0061* (2013.01); *G06K 9/00597* (2013.01); *G06K 9/00604* (2013.01); *G06K 9/036* (2013.01); *G06K 9/4604* (2013.01)

(58) Field of Classification Search
  None
  See application file for complete search history.

(56) References Cited

U.S. PATENT DOCUMENTS

| | | | | |
|---|---|---|---|---|
| 5,481,622 A * | 1/1996 | Gerhardt | ................ | A61B 3/113 345/158 |
| 9,082,000 B2 * | 7/2015 | Nakashima | .......... | G06K 9/0061 |
| 2007/0013866 A1 * | 1/2007 | Sugita | ................ | G06K 9/00597 351/205 |
| 2010/0303294 A1 | 12/2010 | Zschau | | |
| 2011/0267447 A1 * | 11/2011 | Su | ........................ | G06K 9/0061 348/78 |
| 2013/0063582 A1 * | 3/2013 | Choi | .................. | G06K 9/00604 348/78 |
| 2015/0238087 A1 * | 8/2015 | Yamashita | ........... | A61B 5/0077 600/473 |
| 2015/0319826 A1 * | 11/2015 | Ahn | .................... | H05B 37/0227 315/152 |

FOREIGN PATENT DOCUMENTS

| | | | |
|---|---|---|---|
| JP | 2013-518319 A | 5/2013 | |
| KR | 10-2001-0016242 A | 3/2001 | |
| KR | 10-2003-0051970 A | 6/2003 | |
| KR | 10-2010-0083482 A | 7/2010 | |
| KR | 10-2010-0105591 A | 9/2010 | |
| KR | 10-1051433 B1 | 7/2011 | |
| KR | 10-2012-0089527 A | 8/2012 | |
| KR | 10-1272811 B1 | 6/2013 | |
| WO | 03/054777 A1 | 7/2003 | |

OTHER PUBLICATIONS

Korean Notice of Allowance issued in Korean Application No. 10-2014-0142099 dated Feb. 19, 2016.

* cited by examiner

*Primary Examiner* — Brian P Werner
(74) *Attorney, Agent, or Firm* — McDermott Will & Emery LLP

(57) ABSTRACT

The present disclosure relates to a device for detecting a pupil taking account of illuminance and a method thereof, and provides a device for detecting a pupil taking account of illuminance capable of improving detection accuracy of the pupil by detecting a driver's pupil from an image using an adaptive threshold based binarization technique based on a lookup table in which sizes of the pupil corresponding to illuminance are written, and a method thereof.

12 Claims, 2 Drawing Sheets

DEVICE FOR DETECTING PUPIL TAKING ACCOUNT OF ILLUMINANCE AND METHOD THEREOF

CROSS-REFERENCE TO RELATED APPLICATION

This application is based on and claims the benefit of priority to Korean Patent Application No. 10-2014-0142099, filed on Oct. 20, 2014 in the Korean Intellectual Property Office, the disclosure of which is incorporated herein in its entirety by reference.

TECHNICAL FIELD

The present disclosure relates to a device for detecting a pupil taking account of illuminance and a method thereof, and more particularly, to a technology for detecting a pupil from an image based on a lookup table in which sizes of the pupil corresponding to illuminance are written.

BACKGROUND

In accordance with a development of a digital technology, technologies capable of analyzing and classifying image information into specific regions or specific portions have been developed. A face recognition technology among these analyzing technologies, which is a technology integrated with a digital camera as well as an apparatus performing a security technology, or the like, has been studied and developed in a variety of ways.

In addition, a research into a system authenticating identity of an individual using biological characteristics such as a genetic signature, a fingerprint, a voice, a vein, a face shape, a pupil, an iris, or the like, has been actively carried out. Among these, a pupil recognition field is expected to be used the most in future for a security system due to advantages such as a high recognition ratio, unforgeability, pattern characteristics of a large amount of data, no changing factor, and the like.

Particularly, in order to provide a variety of convenience functions (e.g., prevention of drowsy driving, adjustment of a headlight direction based on a driver's gaze, and the like) to a driver in a vehicle, the technology for detecting the pupil of the driver even in a technology for tracking the driver's gaze is a key factor.

Since the technology for detecting the pupil according to the related art detects the driver's pupil from an image by using a fixed threshold based binarization technique without taking account of illuminance of a timing of photographing the image, there is a lack of accuracy.

SUMMARY OF THE INVENTION

The present disclosure has been made to solve the above-mentioned problems occurring in the prior art while advantages achieved by the prior art are maintained intact.

An aspect of the present disclosure provides a device for detecting a pupil taking account of illuminance capable of improving detection accuracy of the pupil by detecting a driver's pupil from an image by using an adaptive threshold based binarization technique based on a lookup table in which sizes of the pupil corresponding to illuminance are written, and a method thereof.

The object of the present disclosure is not limited to the above-mentioned object, and other objects and advantages of the present disclosure can be appreciated by the following description and will be clearly described by the embodiments of the present disclosure. In addition, it will be easily known that the objects and advantages of the present disclosure can be implemented by means and a combination thereof shown in the appended claims.

According to an exemplary embodiment of the present disclosure, a device for detecting a pupil taking account of illuminance includes: a lookup table configured to have sizes of the pupil corresponding to illuminance written therein; an image obtainer configured to obtain a face image; an illuminance measurer configured to measure illuminance at a timing in which the image obtainer obtains the image; a pupil detector configured to convert an eye region of the image obtained by the image obtainer into a binary image using a threshold, extract boundary lines from the converted binary image, and then apply a circle fitting algorithm to the extracted boundary lines so as to detect the pupil; and a controller configured to determine effectiveness of the pupil detected by the pupil detector based on the lookup table.

According to another exemplary embodiment of the present disclosure, a method for detecting a pupil taking account of illuminance includes: obtaining, by an image obtainer, a face image; measuring, by an illuminance measurer, illuminance at a timing in which the image obtainer obtains the image; converting, by a pupil detector, an eye region within the face image obtained into a binary image using a threshold, extracting boundary lines from the converted binary image, and then applying a circle fitting algorithm to the extracted boundary lines so as to detect the pupil; and examining, by a controller, effectiveness of the pupil detected by the pupil detector based on a lookup table.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE INVENTION

Hereinafter, exemplary embodiments of the present disclosure will be described in detail with reference to the accompanying drawings.

Figure 1:
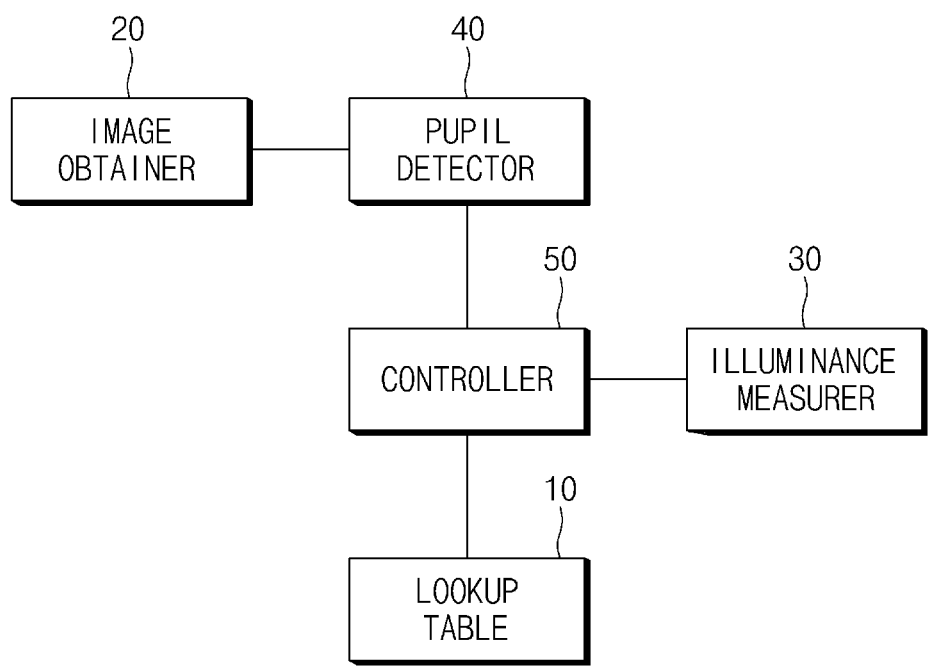
FIG. 1 is a configuration diagram of a device for detecting a pupil taking accounting of illuminance according to an exemplary embodiment of the present disclosure.

FIG. 1 is a configuration diagram of a device for detecting a pupil taking accounting of illuminance according to an exemplary embodiment of the present disclosure.

As shown in FIG. 1, a device for detecting a pupil taking account of illuminance according to the present disclosure includes a lookup table 10, an image obtainer 20, an illuminance measurer 30, a pupil detector 40, and a controller 50.

The above-mentioned components will be described. First, the lookup table 10, which is a table in which sizes of the pupil corresponding to illuminance are written, has values obtained through several experiments in advance. Here, the size of the pupil includes a radius of the pupil, by way of example.

In general, in the case in which illuminance is constant, the radius of the pupil is not changed. Since the radius of the pupil is changed depending on illuminance, the lookup table is created by analyzing a correlation between the illuminance and the radius of the pupil.

Next, the image obtainer 20 may include an infrared camera, photograph a face image of a driver via the infrared camera, and transmit the photographed image to the pupil detector 40. In this case, the infrared camera may be attached to a cluster.

The above-mentioned image obtainer 20 may include an infrared (IR) filter and an infrared light emitting diode (IR LED) as lighting.

Next, the illuminance measurer 30 is positioned around the image obtainer 20 or the face of the driver so as to measure illuminance at a timing in which the image obtainer 20 photographs the image.

Next, the pupil detector 40 applies a threshold technique to an eye region, which is a region of interest (ROI), within the image obtained by the image obtainer 20 so as to convert the eye region into a binary image. That is, the pupil detector 40 checks whether or not intensity of each pixel in the eye region is a threshold or more, and determines pixels having intensity which is the threshold or more as "1" and pixels having intensity which is less than the threshold as "0", thereby generating the binary image.

Typically, the pixel has intensities of 0 to 255, wherein as the intensity closes to 0, the pixel closes to black and as the intensity closes to 255, the pixel closes to white. For example, in the case in which the threshold is set to 150, if the intensities of the pixels within the eye region are 150 or more, the pixel is determined as "1", and if the intensities are less than 150, the pixel is determined as "0", such that a black portion becomes "0" and a white portion becomes "1".

Next, the pupil detector 40 extracts points at which binary values of the pixels are changed from 0 to 1 in the binary image as a boundary line, and applies a circle fitting algorithm to the extracted boundary line, thereby detecting the boundary line closest to a circle among the boundary lines as the pupil. In this case, since it is judged that the circle fitting algorithm, which is a well-known technology, may obscure the gist of the present disclosure, a detailed description thereof will be omitted. Upon obtaining of the boundary line, a size (hereinafter, referred to as a second radius) of the pupil detected by the pupil detector 40 may be determined by the pupil detector 40.

Meanwhile, the pupil detector 40 may also detect the pupil by calculating a coordinate of a center portion in addition to the method for detecting the boundary line.

Next, the controller 50 determines effectiveness of the pupil detected by the pupil detector 40 based on the lookup table 10 in which the sizes of the pupil corresponding to illuminance are written. That is, the controller 50 retrieves a size (hereinafter, referred to as a first radius) of the pupil corresponding to the illuminance measured by the illuminance measurer 30 from the lookup table 10 and then determines whether or not a difference between two sizes of the pupil is within an error range by comparing the retrieved size with the size (i.e., the second radius) of the pupil detected by the pupil detector 40.

If the difference is within the error range, the controller 50 determines that the pupil detected by the pupil detector 40 has effectiveness, and if the difference is out of the error range, the controller 50 adjusts the threshold. That is, the threshold of the pupil detector 40 is newly set. In this case, if the difference between the second radius and the first radius is larger than tolerance, the threshold is increased, and if the difference between the second radius and the first radius is smaller than tolerance, the threshold is decreased.

For example, when it is assumed that the tolerance is ±1 mm (that is, the error range is from −1 mm to 1 mm), 1) if the first radius is 5 mm and the second radius is 7 mm, since the difference is out of the tolerance, that is, the difference between the second radius and the first radius (the second radius−the first radius=2 mm) is larger than the tolerance (1 mm), the threshold is increased.

2) if the first radius is 5 mm and the second radius is 3 mm, since the difference is out of the tolerance, that is, the difference between the second radius and the first radius (the second radius−the first radius=−2 mm) is smaller than the tolerance (−1 mm), the threshold is decreased.

3) if the first radius is 5 mm and the second radius is 6 mm, since the difference is included in the tolerance, that is, the difference between the second radius and the first radius (the second radius−the first radius=1 mm) is within the tolerance, it is determined that the pupil has effectiveness.

4) if the first radius is 5 mm and the second radius is 4 mm, since the difference is included in the tolerance, that is, the difference between the second radius and the first radius (the second radius−the first radius=−1 mm) is within the tolerance, it is determined that the pupil has effectiveness.

5) if the first radius is 5 mm and the second radius is 5 mm, it is naturally determined that the pupil has effectiveness.

In addition, the controller 50 may also set the number of threshold adjustment times for the pupil detector 40 so that an infinite repetition does not occur. That is, the number of threshold adjustment times exceeds a reference value (e.g., the number of 5 times), the controller 50 ends.

Meanwhile, although an example in which the controller 50 and the pupil detector 40 are separately implemented is described in an exemplary embodiment of the present disclosure, the present disclosure may also be implemented in a form in which the controller 50 performs a function of the pupil detector 40.

Additionally, the present disclosure includes the controller 50 that retrieves a size (hereinafter, referred to as a first radius) of the pupil corresponding to the illuminance measured by the illuminance measurer from the lookup table and then adjusts the threshold if a difference between two sizes of the pupil is out of an error range by comparing the retrieved size with a size (hereinafter, referred to as a second radius) of the pupil detected by the pupil detector. The controller 50 increases the threshold if a value obtained by subtracting the first radius from the second radius is larger than tolerance and decreases the threshold if the value obtained by subtracting the first radius from the second radius is smaller than tolerance.

Figure 2:
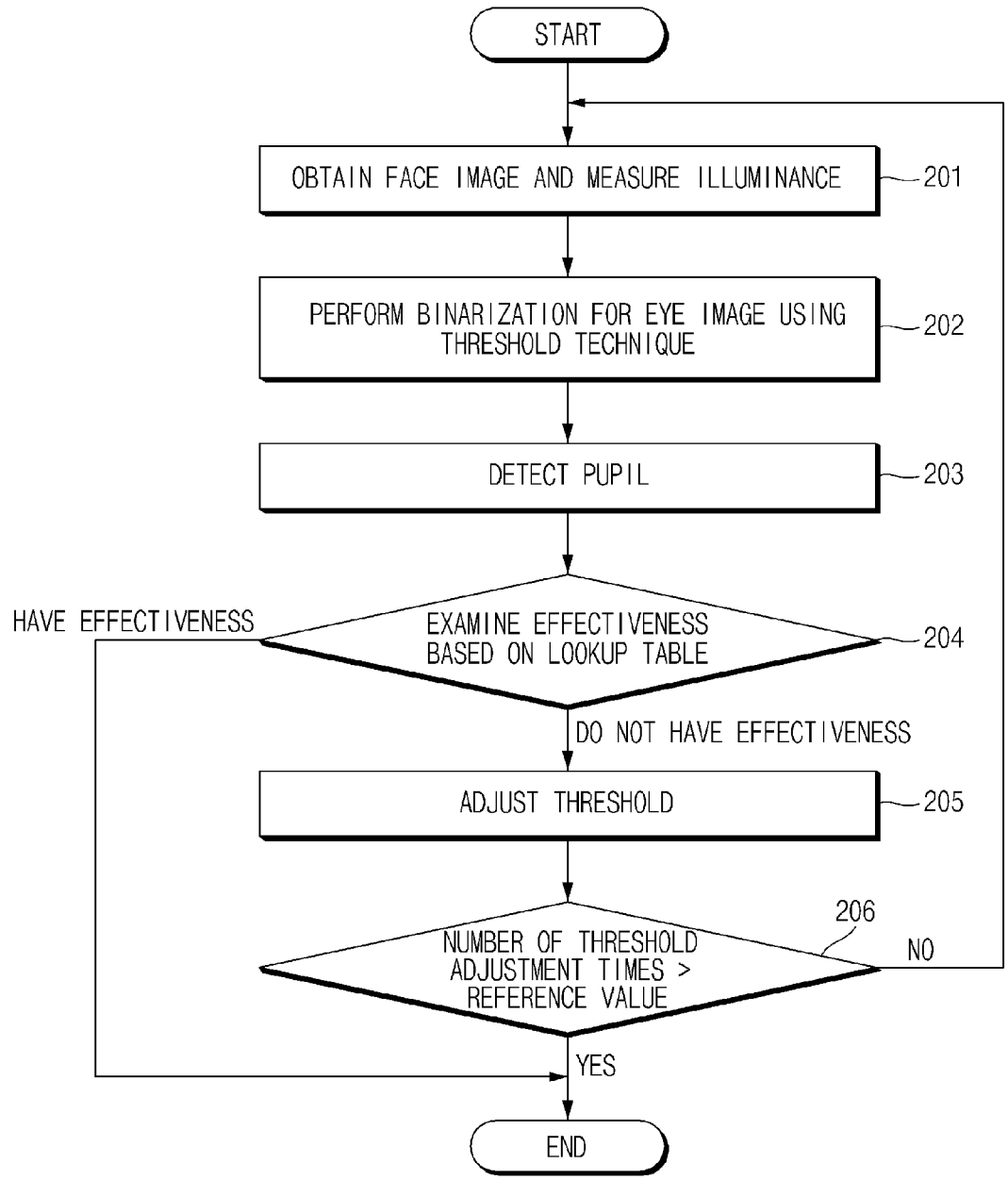
FIG. 2 is a flow chart of a method for detecting a pupil taking account of illuminance according to an exemplary embodiment of the present disclosure.

FIG. 2 is a flow chart of a method for detecting a pupil taking account of illuminance according to an exemplary embodiment of the present disclosure.

First, the image obtainer 20 obtains a face image of a driver and the illuminance measurer 30 measures illuminance at a timing in which the image obtainer 20 obtains the image (201).

Next, the pupil detector 40 applies a threshold technique to an eye region within the face image obtained by the image obtainer 20 so as to convert the eye region into a binary image (202).

Next, the pupil detector 40 extracts points at which binary values of the pixels are changed from 0 to 1 in the binary image as a boundary line, and applies a circle fitting algorithm to the extracted boundary line, thereby detecting the boundary line closest to a circle among the boundary lines as the pupil (203).

Next, the controller 50 examines effectiveness of the pupil detected by the pupil detector 40 based on the lookup table 10 in which the sizes of the pupil corresponding to illuminance are written (204).

As a result of the examination (204), if there is effectiveness, it is determined that the pupil detected by the pupil detector 40 has effectiveness and the flow ends.

As a result of the examination (204), if there is no effectiveness, the threshold of the pupil detector 40 is adjusted (205). In this case, the threshold means a threshold used for performing binarization for the image.

Next, the controller 50 determines whether or not the number of threshold adjustment times exceeds a reference value. If the number of threshold adjustment times does not exceed the reference value, the flow proceeds to the operations starting from "201," and if the number of threshold adjustment times exceeds the reference value, the flow ends.

Meanwhile, the method according to the present disclosure as described above may be created by a computer program. Codes and code segments configuring the computer program may be easily deduced by computer programmers in the art. In addition, the created computer program is stored in a computer readable recording medium (information storage medium) and is read and executed by computers, thereby implementing the method according to the present disclosure. In addition, the recording medium includes all forms of computer readable recording medium.

As described above, according to the exemplary embodiments of the present disclosure, the detection accuracy of the pupil may be improved by detecting the driver's pupil from the image using the adaptive threshold based binarization technique based on the lookup table (LUT) in which the sizes of the pupil corresponding to illuminance are written.

The present disclosure described above may be variously substituted, altered, and modified by those skilled in the art to which the present disclosure pertains without departing from the scope and sprit of the present disclosure. Therefore, the present disclosure is not limited to the above-mentioned exemplary embodiments and the accompanying drawings.

What is claimed is:

1. A device for detecting a pupil taking account of illuminance, the device comprising:
   a lookup table containing a plurality of sizes of the pupil corresponding to different illuminance;
   an image obtainer obtaining a face image;
   an illuminance measurer measuring illuminance at a timing in which the image obtainer obtains the image;
   a pupil detector converting an eye region of the image obtained by the image obtainer into a binary image using a threshold, extracting boundary lines from the converted binary image, and detecting the pupil by applying a circle fitting algorithm to the extracted boundary lines; and
   a controller determining effectiveness of the pupil detected by the pupil detector based on the lookup table.

2. The device according to claim 1, wherein the controller retrieves a first size of the pupil corresponding to the illuminance measured by the illuminance measurer from the plurality of sizes contained in the lookup table, obtains a second size of the pupil detected by the pupil detector, and determines the effectiveness depending on whether or not a difference between the first and second sizes of the pupil is within an error range.

3. The device according to claim 2, wherein the controller determines that the pupil detected by the pupil detector has effectiveness if the difference between the first and second sizes of the pupil is within the error range, and adjusts the threshold if the difference between the first and second sizes of the pupil is out of the error range.

4. The device according to claim 3, wherein the controller increases the threshold if a value obtained by subtracting the first radius from the second radius is larger than an upper limit of the error range, and decreases the threshold if the value obtained by subtracting the first radius from the second radius is smaller than a lower limit of the error range.

5. The device according to claim 1, wherein the controller sets a number of threshold adjustment times for the pupil detector.

6. The device according to claim 1, wherein the pupil detector extracts a point at which a binary value of a pixel is changed from 0 to 1 in the binary image as the boundary line.

7. A method for detecting a pupil taking account of illuminance, the method comprising steps of:
   obtaining, by an image obtainer, a face image;
   measuring, by an illuminance measurer, illuminance at a timing in which the image obtainer obtains the image;
   converting, by a pupil detector, an eye region within the obtained face image into a binary image using a threshold, extracting, by the pupil detector, boundary lines from the converted binary image, and then applying, by the pupil detector, a circle fitting algorithm to the extracted boundary lines so as to detect the pupil; and
   examining, by a controller, effectiveness of the pupil detected by the pupil detector based on a lookup table.

8. The method according to claim 7, wherein the step of examining the effectiveness includes steps of:
   retrieving a first size of the pupil corresponding to the illuminance measured by the illuminance measurer from the lookup table;
   obtaining a second size of the pupil detected by the pupil detector; and
   determining the effectiveness depending on whether or not a difference between the first and second sizes of the pupil is within an error range.

9. The method according to claim 8, wherein the step of determining the effectiveness includes steps of:
   determining that the pupil detected by the pupil detector has effectiveness if the difference between the first and second sizes of the pupil is within the error range; and
   adjusting the threshold if the difference between the first and second sizes of the pupil is out of the error range.

10. The method according to claim 9, wherein the step of adjusting the threshold includes:
    increasing the threshold if a value obtained by subtracting the first radius from the second radius is larger than an upper limit of the error range; and
    decreasing the threshold if the value obtained by subtracting the first radius from the second radius is smaller than a lower limit of the error range.

11. The method according to claim 9, wherein in the step of adjusting the threshold, the threshold is adjusted within a preset number of threshold adjustment times.

12. The method according to claim 7, wherein in the detecting of the pupil, a point at which a binary value of a pixel is changed from 0 to 1 in the binary image is extracted as the boundary line.

* * * * *